United States Patent
Bauer

(10) Patent No.: US 6,208,924 B1
(45) Date of Patent: Mar. 27, 2001

(54) BUS SYSTEM FOR DATA TRANSFER

(75) Inventor: Joachim Bauer, Oberstenfeld-Prevorst (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/171,681

(22) PCT Filed: Mar. 19, 1997

(86) PCT No.: PCT/DE97/00558

§ 371 Date: Apr. 16, 1999

§ 102(e) Date: Apr. 16, 1999

(87) PCT Pub. No.: WO97/40604

PCT Pub. Date: Oct. 30, 1997

(30) Foreign Application Priority Data

Apr. 24, 1996 (DE) ............................................. 196 16 293

(51) Int. Cl.[7] ..................................................... G06F 17/00
(52) U.S. Cl. ..................... 701/45; 701/48; 340/825.14; 340/825.21; 340/825.44; 340/436; 340/669; 370/509; 370/514; 315/77; 315/79; 315/80
(58) Field of Search .................. 701/45, 48; 340/825.21, 340/825.14, 825.44, 436, 669; 370/509, 514; 315/77, 79, 80

(56) References Cited

U.S. PATENT DOCUMENTS

| | | | |
|---|---|---|---|
| 4,381,829 | * 5/1983 | Montaron | 180/274 |
| 5,001,642 | 3/1991 | Botzenhardt et al. | 701/115 |
| 5,303,348 | 4/1994 | Botzenhardt et al. | 395/325 |
| 5,491,383 | * 2/1996 | Leiber et al. | 315/77 |
| 5,621,888 | 4/1997 | Botzenhardt et al. | 395/185.05 |
| 5,640,511 | 6/1997 | Botzenhardt et al. | 395/185 |
| 5,812,802 | * 9/1998 | Bahout et al. | 395/308 |
| 5,835,007 | * 11/1998 | Kosiak | 340/436 |
| 5,964,815 | * 10/1999 | Wallace et al. | 701/45 |
| 5,969,631 | * 10/1999 | Ammler et al. | 340/825.21 |

FOREIGN PATENT DOCUMENTS 35 06 118    8/1986 (DE).

* cited by examiner

Primary Examiner—William A. Cuchlinski, Jr.
Assistant Examiner—Ronnie Mancho
(74) Attorney, Agent, or Firm—Kenyon & Kenyon

(57) ABSTRACT

A bus system for the transmission of messages between a device and at least one peripheral unit is proposed, the messages being in each case transmitted via a sequence of high or low bit states. The control device can send high-priority messages and low-priority messages to the peripheral unit. The high-priority messages have a greater amplitude between the high and low bit states than the low-priority messages.

20 Claims, 4 Drawing Sheets

BUS SYSTEM FOR DATA TRANSFER

FIELD OF THE INVENTION

The present invention relates to a bus system for the transmission of messages.

BACKGROUND INFORMATION

German Patent No. 35 06 118 describes a bus system for the transmission of messages which is also referred to as a CAN bus. With the CAN bus, high-priority messages are transmitted preferentially. For this, each message is preceded by a so-called "header," which decides which message is to be transmitted next when the bus is free. It is not possible, however, to interrupt a message in progress. Furthermore, all messages have the same amplitude between high and low bit states.

In "Bus Contention and Overload Detecting Transmitter," IBM Technical Disclosure Bulletin, Vol. 34, No. 8, Jan. 1, 1992, pp. 10–13, a bus system is described in which messages can be aborted by overwriting bits. Higher-priority messages can then gain access to the bus in a new arbitration subsequent thereto.

SUMMARY OF THE INVENTION

A bus system according to the present invention has an advantage that messages with differing priorities can be clearly separated from one another. Since the high-priority messages can overwrite the low-priority messages at any time, high-priority messages can be transmitted at any time, i.e. even while transmission of a low-priority message is in progress. It is furthermore possible to use, for high-priority messages, completely different processing rules, i.e. a completely different transmission protocol, from those for low-priority messages.

Using a variation in bit length, high-priority messages can be transmitted substantially faster than low-priority messages. In addition, the electromagnetic interference resulting from bit sequences on the bus lines can thereby be minimized in the case of low-priority messages. The transmission of messages can be accomplished on only two bus lines, through which the energy for the peripheral units is additionally transmitted. The outlay for wiring between the control device and peripheral units can thus be minimized. In particularly advantageous fashion, the bus system can be used to trigger safety systems in motor vehicles, continuous diagnosis of the operational readiness of the peripheral units being possible in that context. The reply from the peripheral units is accomplished in particularly simple fashion via a short circuit of the bus lines.

DETAILED DESCRIPTION

Figure 1:
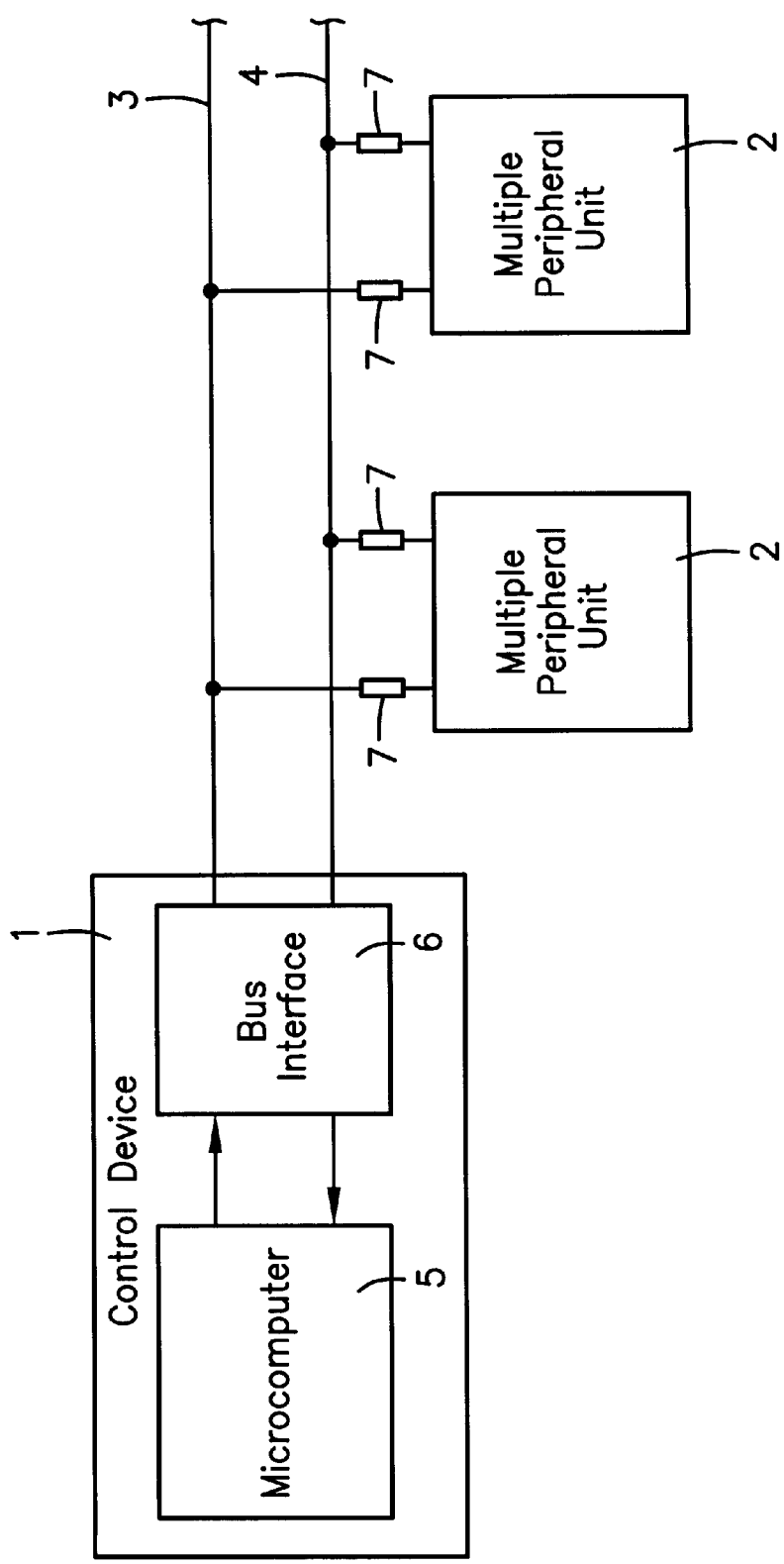
FIG. 1 shows an overview of a bus system according to the present invention.

FIG. 1 shows a control device 1 which is connected via bus lines bus High 3 and bus Low 4 to multiple peripheral units 2. Control device 1 has a microcomputer 5 and a bus interface 6. Bus High line 3 and bus Low line 4 are connected to bus interface 6. Each of the peripheral units is connected, via a protective resistor 7 in each case, to bus High line 3 and to bus Low line 4.

The two lines—bus High 3 and bus Low 4—result in a two-wire bus through which messages can be exchanged between control device 1 and peripheral units 2. Since only two lines are necessary for a bus of this kind, the outlay for wiring between control unit 1 and peripheral units 2 is particularly minimized. The exchange of messages via the bus is accomplished in that the respective transmitting station delivers onto bus lines 3, 4 electrical signals—both current signals and voltage signals—which are then analyzed by the receiving station. Analysis of the signals can be accomplished via a comparison of the two bus lines 3, 4, or instead only the signal from one of the lines is analyzed. The messages consist of a sequence of bit states which in each case can assume only the Low or High bit state.

Figure 2:
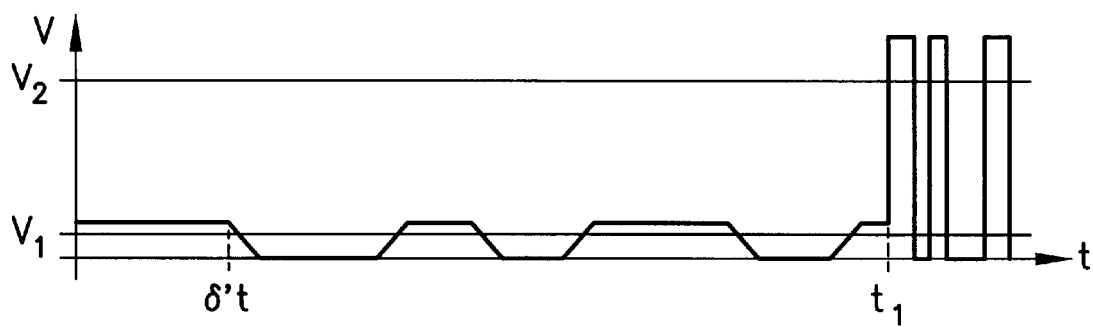
FIG. 2 shows signal levels on the bus system.

FIG. 2 depicts one such sequence of bit states in a diagram. The sequence of bit states is plotted against time t. For the remaining description, it will be assumed that a voltage signal is involved, so that a voltage V is plotted along the vertical axis. The bit sequence will first be considered up to time t1. The bit sequence consists of a voltage signal which lies either above a comparison voltage V1 (bit state=High) or below a comparison voltage V1 (bit state=Low). A bit sequence of this kind can be generated by generating on bus lines 3, 4 corresponding voltage states which are then analyzed as to their difference, or instead one of the lines can be acted upon by a constant potential (for example potential V1), while the other line has a variable potential which corresponds to the bit sequence. The selected amplitude of the voltage signal, i.e. the voltage difference between the High state and Low state, is low, i.e. an amplitude of only a few volts (typically 1 volt) is present. In addition, the bus lines are driven in such a way that the changes between the High and Low bit states do not occur abruptly, but rather require a certain transition time δt. A bit sequence of this kind, with a low amplitude and relatively long transition times between the individual bit states, is suitable only for relatively slow transmission of messages. An advantage of this type of message transmission, however, is that the electromagnetic interference caused by the bus is particularly low. This type of message transmission is therefore particularly suitable when the messages are not of great urgency. The timeframe selected for the bit states, i.e. the time periods required to identify an individual bit as Low or High, is furthermore particularly long with this type of message transmission.

After time t1, the bit sequence transmitted by the bus changes. The bit states have a high amplitude, i.e. they vary between voltage state 0 and a very high voltage signal (typically 10 volts). The transition edges between the individual voltage states are moreover very steep, thus causing strong electromagnetic interference. Because of the very steep edges and the large amplitude of the signals, the times required for recognition of a bit state can be minimized, i.e. the time during which the signal level must be held in a specific state is short. Analysis of this bit sequence is accomplished by comparison with a second voltage level V2 (typically 8 volts), a voltage state above voltage level V2 being interpreted as High, and voltage state below it as Low.

Signals of this kind are particularly suitable for the transmission of urgent messages, in which a great deal of information must also be transmitted in a short period.

Because the amplitudes are different, high-priority messages can thus be distinguished at any time from the low-priority messages. It is therefore no longer necessary, in order to send out a high-priority message, to wait until the low-priority message has been completely sent; transmission of the more important message can instead be started at any time. For this purpose, the bus signals are analyzed by circuits which separate the different amplitudes of the bit states present on the bus.

Figure 3:
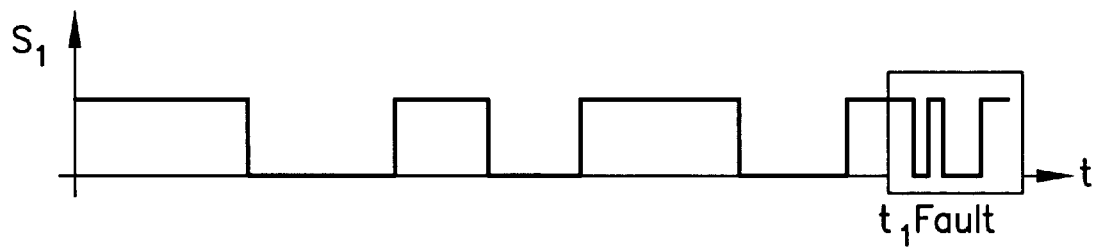
FIG. 3 shows the messages separated therefrom.
Figure 4:
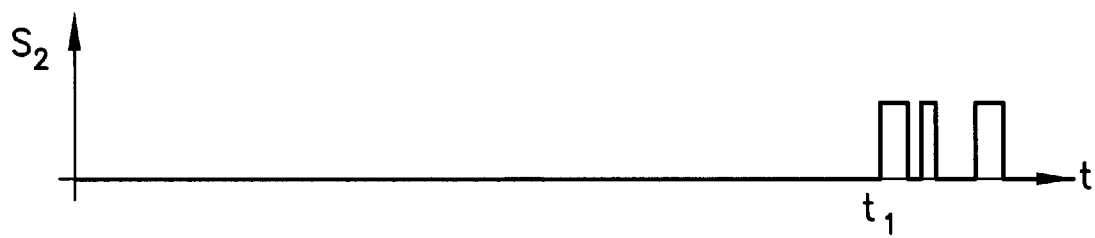
FIG. 4 shows a high priority message.

FIGS. 3 and 4 depict the respective separated signals.

FIG. 3 depicts a signal S1 which was obtained by comparing the bit states on the bus to potential V1. Up to time t1, this is the message that was transmitted at low amplitude. After time t1, the higher-amplitude signal is erroneously analyzed. This is immaterial, however, since at this point in time processing of the higher-priority signal, which is sent out at high amplitude, had begun, thus halting processing of the low-priority signal. This high-priority signal is depicted in FIG. 4. Signal S2 is plotted against time, signal S2 having been obtained by comparing the bit level to potential V2. As is evident, no signal occurs until time t1. Only after time t1 is a signal recognized. This signal represents a signal which is to be processed on a high-priority basis.

The system shown in FIG. 1, comprising control device 1, peripheral units 2, and bus lines 3, 4, is intended in particular as an airbag system. This has a central control device 1 and peripheral units 2, which each have an airbag, a side airbag, a belt tensioner, or other elements. In an airbag system of this kind, the commands to trigger the individual peripheral units 2 must be transmitted on a high-priority basis, no delay whatsoever being tolerated therein. In addition, a system of this kind should be capable of continuously checking the operability of the individual peripheral units 2. Provision is therefore made for control device 1 to send diagnostic requests to peripheral units 2, which can then confirm their ability to function via a return signal. The diagnostic requests are of low priority compared to the commands to trigger peripheral units 2. The bus system according to the present invention can thus be used in particularly advantageous fashion for an airbag system in which diagnostic data regarding the operational readiness of the individual peripheral units 2 are continuously exchanged between the control device and the associated peripheral units, and commands which result in triggering of the functions of the individual peripheral units 2—such as inflating an airbag or triggering a belt tensioner—must then be transmitted on a high-priority basis from control device 1 to peripheral units 2. Since the commands sent out from control device 1 can at any time, because of the greater amplitude, overwrite the diagnostic requests sent out by the control device, the commands can be delivered onto the bus without delay, proceeding from any intermediate state of the diagnostic request.

Figure 5:
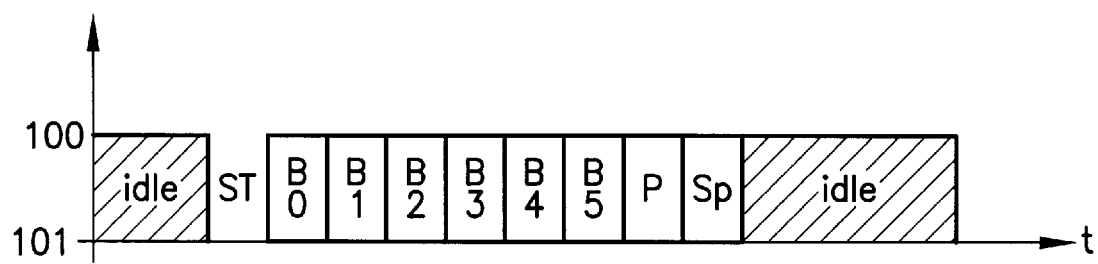
FIG. 5 shows the coding of a diagnostic request or a triggering command.

Because of the amplitude separation of diagnostic requests and commands, the two message classes can be processed entirely differently. As described above, for example, it is not necessary to provide identical bit lengths for the two message classes; the important messages can instead be transmitted with a higher bit rate. It is furthermore possible to provide different message protocols for the two different message classes. A protocol of this kind is an instruction as to how to process the individual messages. This is explained further in FIGS. 5 and 6. In FIG. 5, the protocol for a diagnostic request is explained. In FIG. 5, the High bit state 100 and Low bit state 101 are plotted against time. Beginning from an Idle bit state, which here corresponds, for example, to a High state, a start bit St is sent. This is then followed by six bits (bits B0 through B5) in which an address of a peripheral unit 2 is specified. These six bits are protected by a subsequent parity bit P. There then follows a stop bit (SP) which represents the end of the diagnostic request sent out by control device 1. The bus then transitions back into the Idle state, i.e. the High bit level. Peripheral unit 2 addressed by the diagnostic request then sends a message to control device 1; this message indicates whether peripheral unit 2 is ready to operate. In the simplest case, this message consists in the fact that after the diagnostic request is sent out, during the Idle bit state and after a predefined time following the diagnostic request, a so-called "Alive" signal, i.e. a single bit, is delivered onto the bus by the peripheral unit if the peripheral unit is ready to operate. An Alive signal of this kind can be generated particularly easily by the fact that the peripheral unit being addressed briefly short-circuits the two bus lines—bus High 3 and bus Low 4—to one another. More complex replies consisting of a bit sequence are nevertheless also possible.

Figure 6:
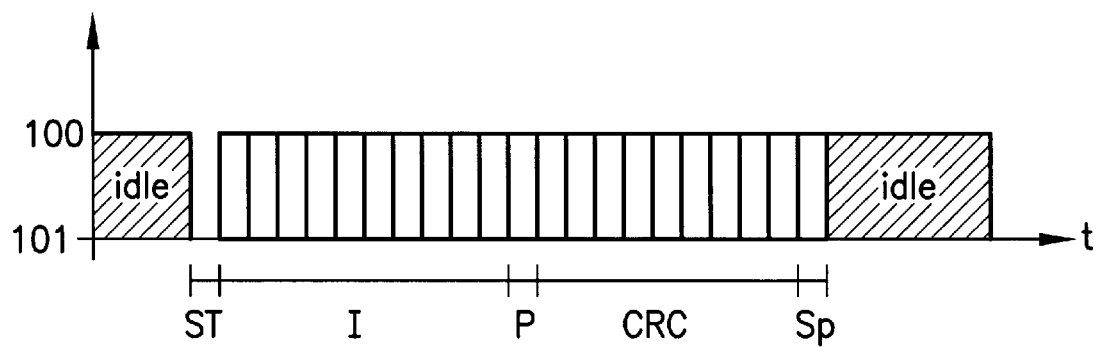
FIG. 6 shows a protocol for a triggering command for a peripheral unit.

FIG. 6 depicts the protocol for a triggering command for a peripheral unit 2. Proceeding from an Idle bus state, which is defined here by a High state 100, there follows a first start bit (ST) which indicates the beginning of the message. This is followed by an information field (I) which in this case has a length of 10 bits. Any other desired lengths for the information field are also conceivable, however. A parity bit P and a CRC field, which can be used to determine whether all the bits of information field I were transmitted correctly, are then also provided to protect information field I. The CRC field is then followed by a stop bit SP, and the bus then transitions back into the Idle state. Each bit of information field I can represent a triggering command for a peripheral unit 2. Depending on whether the bit is set to High or Low, peripheral unit 2 triggers its safety function, for example firing the pyroelectric propellant for an airbag or a belt tensioner. By way of a command such as the one depicted in FIG. 6, the control device can thus command which peripheral units 2 are and are not to be triggered. Since a single incorrectly set bit determines whether or not an airbag is triggered, a very long CRC field is provided in order to protect the bits transmitted in the information field against mistransmission. Provision can also be made for the message shown in FIG. 6 to be sent out several times, since for safety-related systems such as an airbag, a guarantee must be provided in all circumstances that airbag firing will occur in the event of an accident.

The bus system according to the present invention is thus suitable for transporting messages with completely different specifications in terms of processing of the messages, using the same lines. The diagnostic request as described in FIG. is processed on the basis of a completely differently configured transmission protocol than the command according to FIG. 6. The diagnostic request as shown in FIG. 5 can also, for example, be transmitted using a so-called V24 protocol, while the triggering command as defined in FIG. 6 can also be accomplished, for example, using the CAN protocol.

Figure 7:
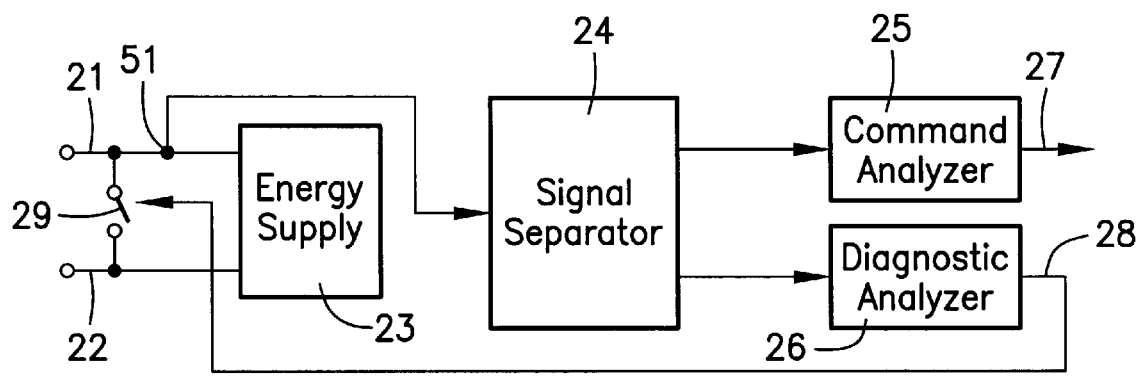
FIG. 7 shows a bus coupling of the peripheral unit.

FIG. 7 schematically shows the input signal processing system of a peripheral unit 2. The peripheral unit has two input lines 21 and 22 which are connected to the bus lines. The two lines 21 and 22 are connected to an energy supply 23. One of the input lines 21 is also connected to a signal separator 24. The signal separator separates the high-amplitude signals from the low-amplitude signals, and conveys the high-amplitude signals to a command analyzer 25 and the low-amplitude signals to a diagnostic analyzer 26. Signal separator 24 has applied to its input a signal such as the one shown in FIG. 2. Using amplitude separation, the signal separator then makes available the signal as shown in FIG. 4 for command analyzer 25, and the signal as shown in FIG. 3 for diagnostic analyzer 26. Because of this clear separation of the signals, the diagnostic requests and the commands for triggering the peripheral unit can be processed separately from one another. Command analyzer 25 recognizes incoming commands for the respective peripheral unit, i.e. it checks whether the incoming commands are intended for the respective control device, and checks, on the basis of the parity bit and CRC field as defined in FIG. 6, as to whether a command for the corresponding control device is actually present. If such a command is recognized, a corresponding output signal—with which, for example, a driver circuit for firing a pyroelectric igniter for an airbag can be activated—is delivered onto output line 27 for further processing. As was described, for example, with reference to FIG. 5, the diagnostic analyzer checks whether the diagnostic request was intended for the particular control device. It then checks whether peripheral unit 2 is functional; this task can also be performed by a further circuit which is not depicted in FIG. in the interest of simplicity. The result of the diagnosis is then output via output line 28, and thus reported back to control device 1. FIG. 7 shows a very simple form of return message, i which a signal on output line 28 can close a switch 29 which short-circuits the two input lines 21 and 22 to one another. This short circuit of the two lines 21, 22, via protective resistors 7, causes the potentials on bus lines 3, 4 to approach one another; this can be detected by control device 1.

Figure 8:
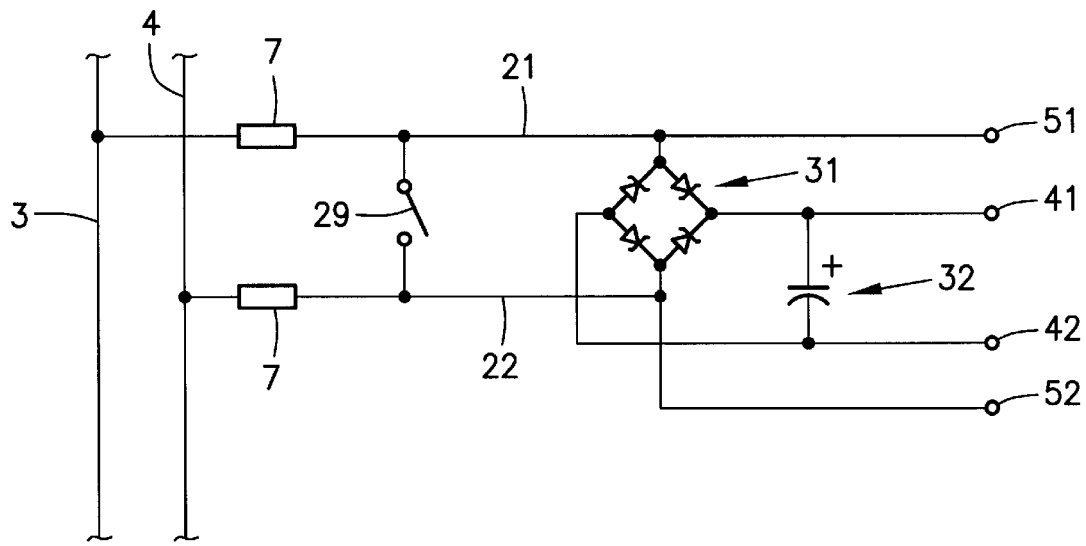
FIG. 8 shows an energy supply of the peripheral unit.

FIG. 8 explains energy supply 23 in more detail. The energy supply consists here of a rectifier 31 and a smoothing capacitor 32, rectifier 31 being connected through input lines 21, 22 via resistors 7 to bus lines 3, 4. Thus not only the information for activation or diagnosis of the peripheral units, but also the energy necessary for the operation of peripheral units 2, is sent via bus lines 3, 4. As a result of rectifier circuit 31, the energy supply is independent of the polarity of lines 3, 4. In addition, energy supply 23 has power supply means (not depicted here) so as not to stress the dynamic signals on bus lines 3, 4. When bus lines 3, 4 must each be switched back and forth between a ground potential (Low) and a voltage level (High), an uninterrupted power supply requires ensuring that one of the two bus lines 3, 4 is respectively switched to a High voltage level. This means that if a High level is output on the one bus line, a Low level must be present on the other bus line, or vice versa, so that at least one of the two bus lines 3, 4 has a final voltage level by comparison with the ground potential that is present at node 42. The supply voltage for peripheral unit 2 is then present at node 41 of rectifier 31. The signals present on the bus can be tapped both via node 51 from line 21 and via node 52 from line 22. If the signal-processing circuit elements—such as, for example, signal separator 24, command analyzer 25, or diagnostic analyzer 26—proceed from a specific polarity of the bit states, any reversal of bus lines 3 or 4 might cause signals of incorrect polarity to be transmitted. This can be prevented by the fact that at the outset, the polarity on bus lines 3, 4 is determined by peripheral unit 2, and then signals are tapped selectably at nodes 51 or 52, i.e. selectably either from bus line 3 or from bus line 4. In FIG. 7, it was assumed that signal tapping is accomplished via node 51 on input line 21.

Figure 9:
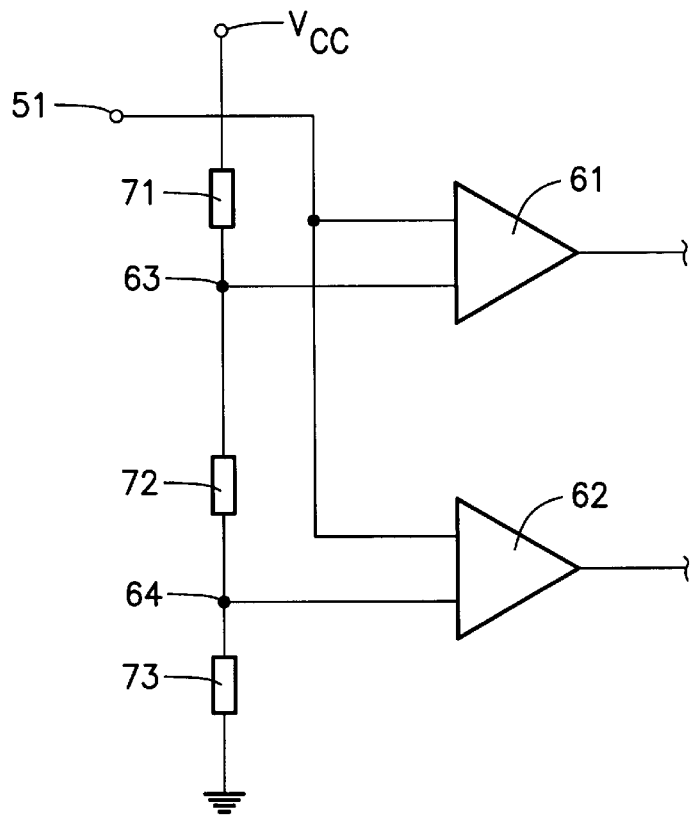
FIG. 9 shows a signal separator of the peripheral unit.

Signal separator 24 is explained in FIG. 9. The signal separator has two comparators 61 and 62, whose noninverting inputs are each connected to node 51. The inverting inputs of comparators 61 and 62 are connected to voltage nodes 63 and 64, whose potential is established by a voltage divider having three resistors 71, 72, and 73. The voltage divider is arranged between supply voltage VCC and ground. The voltage divider is designed so that comparison voltage V2 known from FIG. 2 is present at comparison node 63, and comparison voltage V1 known from FIG. 2 is present at node 64. The output signal of comparator 61 thus represents the signal of FIG. 4, and the output signal of comparator 62 represents the signal of FIG. 3. The circuit shown in FIG. 9 makes it possible, with simple means, to achieve a separation of the signals having different amplitudes.

What is claimed is:

1. A bus system for transmitting messages, comprising:
   at least one peripheral unit; and
   a device transmitting high-priority messages and low-priority messages to the at least one peripheral unit,
   wherein the messages are transmitted via a sequence of at least one of high bit states and low bit states,
   wherein the high-priority messages have a first amplitude between first high bit states and first low bit states, and the low-priority messages have a second amplitude between second high bit states and second low bit states, the first amplitude being greater than the second amplitude.

2. The bus system according to claim 1, wherein a first time duration of each of the first high bit states and the first low bit states is shorter than a second time duration of each of the second high bit states and the second low bit states.

3. The bus system according to claim 1, further comprising:
   bus lines transmitting the messages,
   wherein the at least one peripheral unit includes an energy supply which is coupled to the bus lines.

4. The bus system according to claim 1, wherein the at least one peripheral unit triggers an airbag, and wherein the low-priority messages include a diagnostic request indicative of an operational readiness of the airbag, and the high-priority messages include a triggering command for the airbag.

5. The bus system according to claim 4, wherein the at least one peripheral unit is coupled to the bus lines, and wherein the diagnostic request includes an address of the at least one peripheral unit, the at least one peripheral unit transmitting to the device a reply indicative of an operational readiness of the at least one peripheral unit.

6. The bus system according to claim 5, wherein the reply includes a short circuit of the bus lines.

7. A peripheral unit of a bus system, comprising:
   a first arrangement receiving high-amplitude signals and low-amplitude signals via bus lines of the bus system;
   a signal separator separating the high-amplitude signals and the low-amplitude signals;
   wherein the high-amplitude signals and the low-amplitude signals are transmitted via a sequence of bits each having at least one of high bit states and low bit states, and
   wherein the high-amplitude signals have a first amplitude between a first high bit state and a first low bit state, and the low-amplitude signals have a second amplitude between a second high bit state and a second low bit state, the first amplitude being greater than the second amplitude.

8. The peripheral unit according to claim 7, further comprising:

a second arrangement comparing a destination address to an address of the peripheral unit, wherein the signals include the destination address.

9. The peripheral unit according to claim 8, wherein, if the peripheral unit receives the high-amplitude signals, the peripheral unit aborts processing the low-amplitude signals.

10. The peripheral unit according to claims 8, further comprising:

a third arrangement transmitting a reply, wherein the low-amplitude signals includes low-priority signals.

11. The peripheral unit according to claims 10, wherein the low-priority signals include a diagnostic request.

12. The peripheral unit according to claim 8, wherein the reply is signaled by a short-circuiting of the bus lines.

13. The peripheral unit according to claim 8, wherein the peripheral unit receives an energy via the bus system.

14. The peripheral unit according to claim 7, wherein the peripheral unit is configured as a triggering unit for at least one of an airbag and a belt tensioner system.

15. A device for transmitting messages to at least one peripheral unit, comprising:

an arrangement transmitting high-priority messages and low-priority messages, wherein the high-priority messages and the low-priority messages are transmitted via a sequence of bits each having at least one of high bit states and low bit states, wherein the high priority-messages have a first amplitude between a first high bit state and a first low bit state, and the low-priority messages have a second amplitude between a second high bit state and a second low bit state, the first amplitude being greater than the second amplitude.

16. The device according to claim 15, wherein the high-priority messages include first bits having a first duration and the low-priority messages have second bits having a second duration, the first duration being shorter than the second duration.

17. The device according to claim 15, wherein the high-priority messages are transmitted prior to completion of transmitting the low-priority messages.

18. The device according to claim 15, wherein the high-priority messages are transmitted prior to completion of reception of the messages by the at least one peripheral unit.

19. The device according to claim 15, wherein the low-priority messages include a diagnostic request which is indicative of an operational reliability of the at least one peripheral unit, and wherein the high-priority messages include a triggering command for the at least one peripheral unit.

20. The device according to claim 15, further comprising:

a further arrangement receiving the messages from the at least one peripheral unit.

* * * * *

UNITED STATES PATENT AND TRADEMARK OFFICE
CERTIFICATE OF CORRECTION

| | |
|---|---|
| PATENT NO. | : 6,208,924 B1 |
| APPLICATION NO. | : 09/171681 |
| DATED | : March 27, 2001 |
| INVENTOR(S) | : Joachim Bauer |

It is certified that error appears in the above-identified patent and that said Letters Patent is hereby corrected as shown below:

Column 7, line 5, "the signals" should be -- the high-amplitude and low-amplitude signals --.

Signed and Sealed this

Twenty-fifth Day of September, 2007

JON W. DUDAS
*Director of the United States Patent and Trademark Office*